United States Patent [19]

Townsend

[11] Patent Number: 4,914,474
[45] Date of Patent: Apr. 3, 1990

[54] SPEED CONTROL FOR FILM AND DOCUMENT TRANSPORT DRIVES IN A MICROFILM CAMERA

[75] Inventor: Ensley E. Townsend, Rochester, N.Y.
[73] Assignee: Eastman Kodak Company, Rochester, N.Y.
[21] Appl. No.: 204,836
[22] Filed: Jun. 10, 1988
[51] Int. Cl.$^4$ .................... G03B 27/32; G03B 27/52
[52] U.S. Cl. ............................... 355/64; 355/50
[58] Field of Search ........................ 355/50, 64, 65

[56] References Cited

U.S. PATENT DOCUMENTS

| | | | |
|---|---|---|---|
| 3,820,893 | 6/1974 | Donohue et al. | 355/50 |
| 3,861,799 | 1/1975 | Chiswell et al. | 355/64 |
| 3,917,400 | 11/1975 | Roder et al. | 355/50 |
| 4,006,395 | 2/1977 | Reesen | 318/685 |
| 4,084,083 | 4/1978 | McNally et al. | 364/118 |
| 4,099,103 | 7/1978 | Seeger et al. | 318/85 |
| 4,148,579 | 4/1979 | Axelrod et al. | 355/41 |
| 4,259,621 | 3/1981 | Jakobsen et al. | 318/85 |
| 4,297,624 | 10/1981 | Komiya | 318/594 |
| 4,350,936 | 9/1982 | Jackson | 318/7 |
| 4,405,884 | 9/1983 | Weber | 318/85 |
| 4,426,149 | 1/1984 | Kuemmel et al. | 355/8 |
| 4,464,615 | 8/1984 | Rodi | 318/625 |
| 4,562,388 | 12/1985 | Wolf | 318/301 |

Primary Examiner—Monroe H. Hayes
Attorney, Agent, or Firm—Dennis R. Arndt

[57] ABSTRACT

A servo controlled film drive for an automatic microfilm camera wherein the rotation of the metering roller of the film drive is electroncially synchronized to the rotation of the drive rollers of the document transport. The film drive is powered by a DC motor, while the document transport is powered by an AC motor (main drive motor). The variable speed film drive is computer programmable and uses phase-locked loop control circuits and optical incremental shaft encoders to maintain precise synchronization between the metering roller and the drive rollers at a predetermined ratio. The angular motion of the metering roller relative to the angular motion of the drive rollers is directly proportional to the linear velocity of the film relative to the linear velocity of the document in the transport. This relationship is directly proportional to the reduction ratio of the microfilm camera.

10 Claims, 4 Drawing Sheets

SPEED CONTROL FOR FILM AND DOCUMENT TRANSPORT DRIVES IN A MICROFILM CAMERA

TECHNICAL FIELD

The present invention relates to an automatic microfilm camera where the film drive is electronically synchronized according to a predetermined ratio to the speed of the drive means for the document transport system.

CROSS-REFERENCE TO RELATED APPLICATIONS

Reference is made to commonly-assigned, copending U.S. patent applications Ser. No. 204,794, entitled "AUTOMATIC LENS SELECTION OR DESIRED OPTICAL REDUCTION RATIO IN A MICROFILM CAMERA", in the names of E. E. Townsend and R. V. Barry, and Ser. No. 204,795, entitled "AUTOMATIC ADJUSTMENT OF FOCAL LENGTH TO OBTAIN DESIRED OPTICAL REDUCTION RATIO IN A MICROFILM CAMERA", in the name of E. E. Townsend, both filed concurrently herewith.

BACKGROUND ART

Microfilm copying is a process in which photographically reduced images of documents are sequentially formed, usually in successive frames on a reel of film. The microphotographing process involves moving the documents to a copy area, exposing the film, and thereafter removing the documents from the copy area. During this process, the film speed required for normal microfilming is directly proportional to the optical reduction ratio. In a rotary microfilmer, the document and film are in continuous motion during the microphotographing process. The film drive of a typical rotary microfilmer enables the film to be driven in a high speed mode (for rapid film advance) and at least one other speed for normal microfilming operation. In the past, a single AC main drive motor has been used to drive documents through the document transport system and simultaneously drive the film via a mechanical gearbox and electromechanical clutches. The mechanical gearbox reduced the high speed output of the main drive motor to the required low speed of the film drive by using a combination of timing belts, pulleys, and various types of gears.

Each additional optical reduction ratio requires a different film speed which in turn requires more clutches, gears and/or timing belts and pulleys. Consequently, the traditional film drive of a multiple reduction ratio rotary microfilmer was bulky and expensive. A microfilm camera of this type is illustrated in U.S. Pat. No. 3,861,799.

This type of prior art film drive limits the physical location of the film drive within the microfilmer; the film drive must be located such as to allow mechanical linkage to the main drive motor. Another disadvantage associated with the traditional film drive is that in the event a mismatch occurs between the mechannical reduction ratio (the film velocity relative to the document speed) and the optical reduction ratio correction required modifications in the mechanical gearbox.

Attempts were made to overcome some of these problems by precisely controlling the speed of the document transport and the film speed asynchronously or independently of one another. U.S. Pat. No. 4,148,579 illustrates a film drive unit controlled by an optical shaft encoder to ensure precise control of the film speed. A disadvantage of this arrangement is that heavier documents may load or slow the document transport but the film drive would not react to the slowing of the transport system and would continue to move the film at its regulated speed, thereby resulting in a distortion of the image on the film.

Accordingly, an object of the invention is to eliminate the above disadvantages in addition to eliminating the mechanical gearbox, electromagnetic clutches, and mechanical linkages between the film drive and the document transport.

Another object of the computer programmable variable speed film drive is that such a drive does not require additional hardware to accommodate additional reduction ratios. No longer will it be necessary to change hardware components in order to correct a mismatch between the optical reduction ratio and the mechanical reduction ratio.

Still another object is to provide greater freedom in positioning the film drive in areas remote from the document drive because the mechanical transmission or gearbox is no longer a consideration.

Yet another object is to provide a means of determining electronically the amount of unexposed film remaining on the film supply roll.

DISCLOSURE OF THE INVENTION

It is an object of the present invention to provide an automatic microfilm camera comprising a document transport system with means such as a motor for driving the system and means connected to a shaft of the document drive system for generating a first signal proportional to the speed of the motor. Means such as a programmable frequency multiplier for generating a second signal in response to the first signal. Means controlling the speed of the film drive such as a servo controlled DC motor that responds to the second signal so as to electronically synchronize with respect to a predetermined ratio the speed of the film drive to the speed of said document transport.

BRIEF DESCRIPTION OF THE DRAWINGS

Modes of carrying out the invention will be described with reference to the drawings wherein.

MODES OF CARRYING OUT THE INVENTION

Because automatic microfilm cameras are well known, the present description will be directed in particular to the elements forming part of the present invention and its use in such photographic cameras. It will be understood that camera elements not specifically shown or described may take various forms well known to those having ordinary skill in the art.

Figure 1:
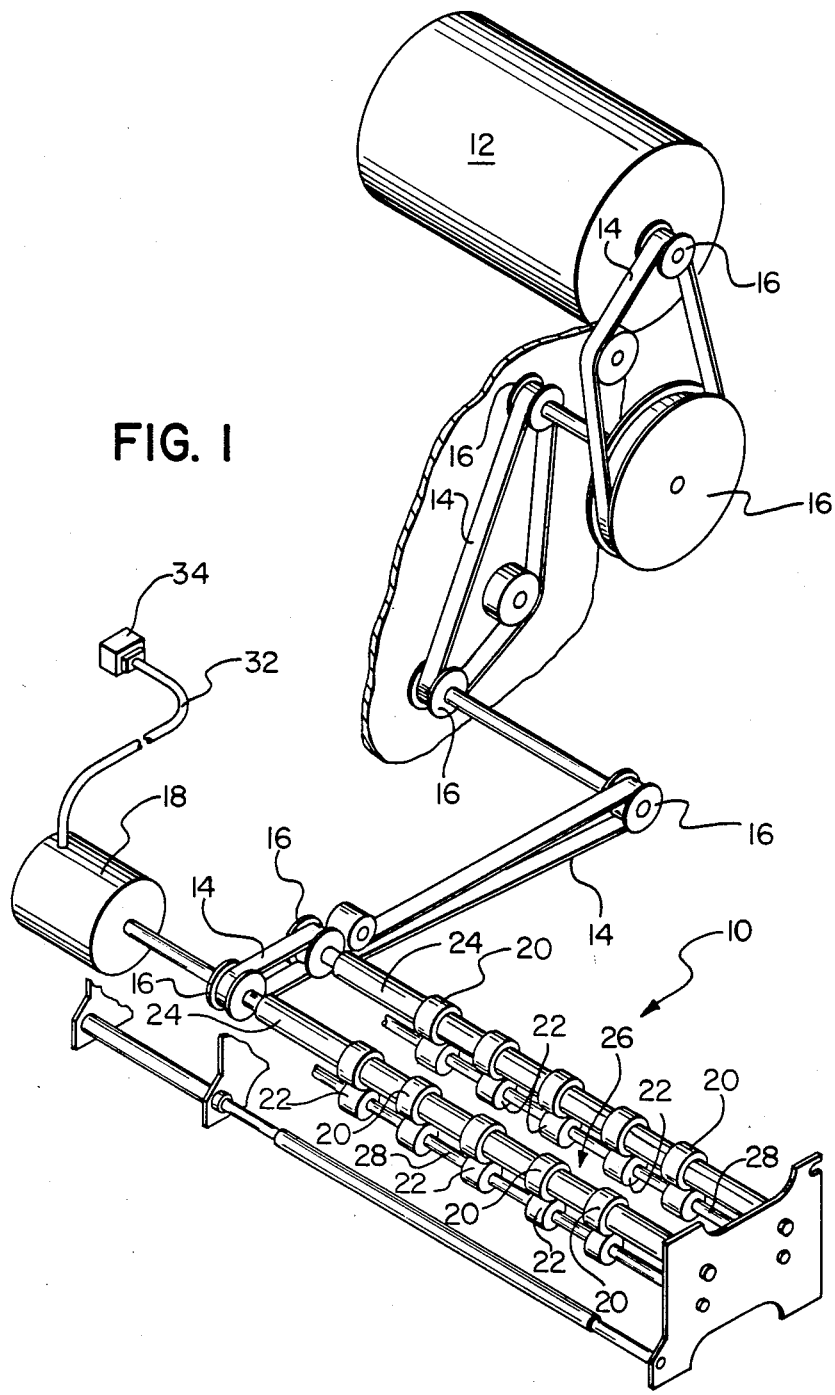
FIG. 1 is a schematic perspective diagram illustrating the basic components of the document drive system according to the present invention.

Referring to FIG. 1, the drive mechanism for the document transport system 10 are shown and comprise a main drive AC mootr 12, drive belts 14, drive pulleys 16, optical incremental encoder 18, drive rollers 20, normal force rollers 22 and drive roller shafts 24. The main drive AC motor 12 is powered from the AC electric main supply (not shown) and the motor 12 supplies mechanical power to the document transport system 10 including all the drive rollers 20. Mounted on the shaft of the main drive motor 12 is a pulley 16, which directs the mechanical power of the motor 12 through a series of belts 14 and pulleys 16 to the drive rollers 20 mounted on shaft 24. What is commonly known as the photographic aperture or exposure station is generally shown at 26. It is located in the space between the drive roller shafts 24 and the two sets for normal force rollers 22 mounted on shafts 28. Normal force or pressure rollers 22 urge the document against the drive rollers 20, so that the document is moved through the photographic aperture or exposure station 26, where the document is illuminated and photographed by means not shown.

The optical incremental encoder 18, sometimes referred to as an aperture encoder or shaft encoder, is mounted directly to the first drive roller shaft 24. The frequency of the aperture encoder's output signal is the product of the drive roller shaft's angular velocity in revolutions per second, and the encoder's resolution in line pairs per revolution. A line pair of the encoder's disk results in one cycle, consisting of a rising and a falling edge of the square wave output. The greater the number of line pairs, the finer each revolution may be divided so that the accuracy and speed control are increased accordingly. The encoder signal is fed to a servo control electronics board 30 illustrated in FIG. 2, via cable 32 attached by connector 34 (FIG. 1). DC power is also delivered from the servo electronics board 30 by the cable 32 to the optical encoder 18.

FILM DRIVE

Figure 2:
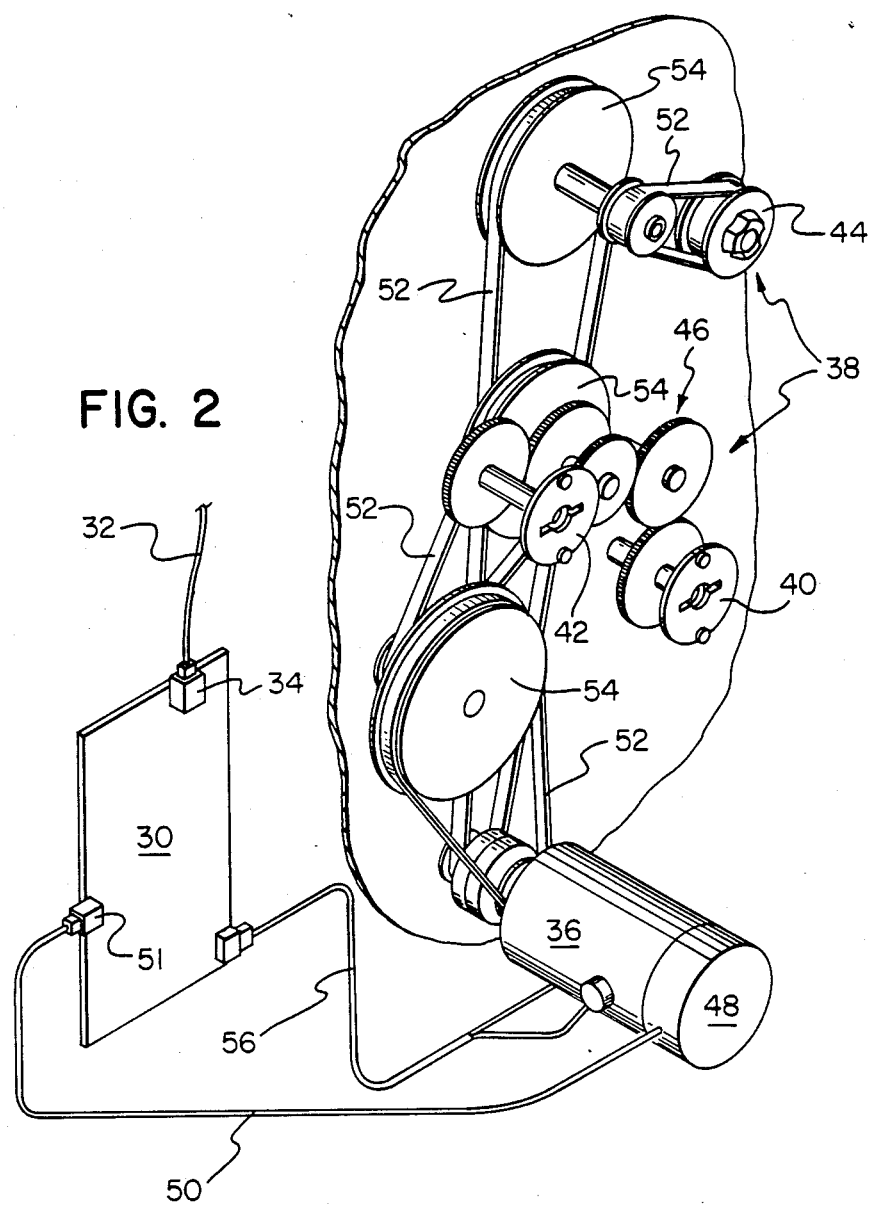
FIG. 2 is a schematic perspective diagram of the film drive's major control and drive components according to the present invention.

DC motor 36, illustrated in FIG. 2, supplies power to the film drive shown generally at 38 and is comprised of film supply drive 40, film take-up drive 42 and film metering roller drive 44. Power from the DC motor 36 is transferred by a series of drive belts 52 and drive pulleys 54 to the film drive components 40, 42, and 44. An appropriate gear drive 46 is provided to maintain the required tension and film speed between the film take-up 42 and the film supply 40 during film transport. The film is exposed at the film metering roller drive 44 (by means not shown). Accordingly, it is necessary that the angular rotation of the metering roller drive 44 is controlled in such a way that the motion of the film is correlated accurately with the linear velocity of the document. The servo control electronics board 30, also referred to as servo board, controls the angular rotation of the DC motor 36 and hence the angular rotation of the metering roller drive 44 to ensure proper coordination of the film motion to the document motion for a given reduction ratio. The optical incremental encoder 48 is mounted directly to the shaft of the DC motor 36 for the most accurate control of the motor speed. The feedback encoder 48 provides a TTL output waveform indicative of the angular velocity of the shaft of DC motor 36. The frequency of the output waveform of the feedback encoder is the product of the angular velocity of the DC motor 36 in revolutions per second, and the resolution in line pairs per revolution of the encoder 48.

The signal from the encoder 48 is fed into the servo board 30 via cable 50 connected to the board by plug 51 as shown in FIG. 2. The cable 50 is also used to transport DC power from the servo board 30 to the encoder 48. Another cable 56 is connected between the servo board 30 and the DC motor 36 and provides the requisite power to the DC motor 36 to maintain the correct controlled speed for the film drive 38.

Figure 3:
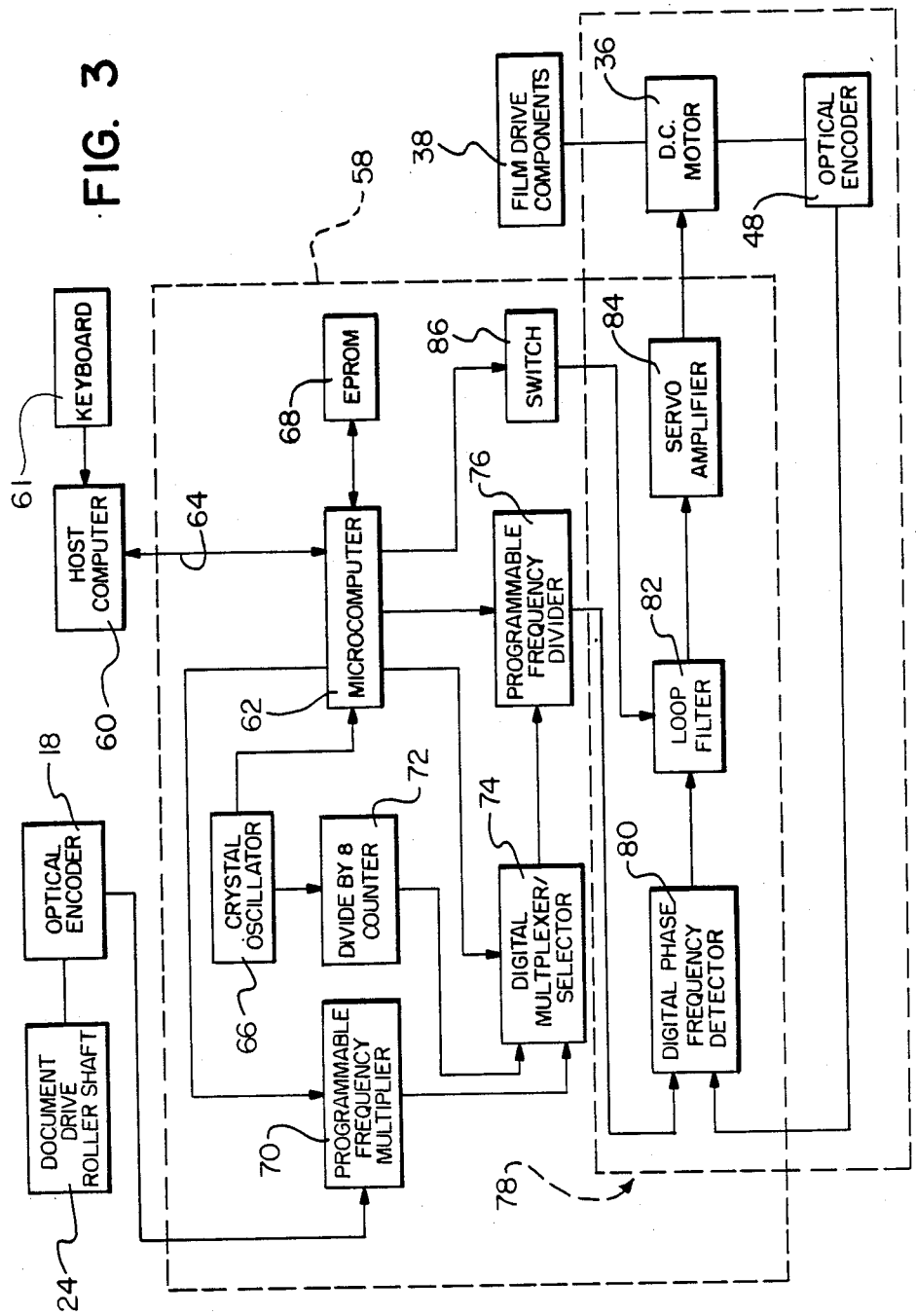
FIG. 3 is a schematic block diagram illustrating the electonics forming a part of the present invention.

FIG. 3 illustrates the major functional elements contained on the servo electronics board 30 and some of the external elements that are connected to the board 30. The broken line 58 indicates the electronic board 30 and all elements within its boundry reside on the electronics board 30.

The host computer 60 is the main control computer for the microfilmer; it is this computer that sends commands such as film drive start and stop and film speed select to the electronic board 30 where microcomputer 62 is located. The microcomputer 62 transmits status information related to the operation of the film drive 38 to the host computer 60. The microcomputer 62 is a single-chip, 8-bit microcomputer such as the Intel 8032, which contains, among other functions, 256 bytes of RAM memory, three 16-bit timer/counters, six interrupt sources and a programmable full duplex serial communication channel 64. It is used for communication between microcomputer 62 and the host computer 60. A crystal oscillator 66 is a typical quartz crystal oscillator with a TTL output at 11.05920 MHz and is used to provide the internal clocking and timing signals of the microcomputer 62. In addition, crystal oscillator 66 provides a clock signal, as will be described later, which can be selected as the reference signal input for the servo system controlling the DC motor 36 and film drive 38 instead of the signal derived from aperture encoder 18. EPROM 68 is an erasable programmable read-only memory such as a Hitachi Part No. HN27512G-25. EPROM 68 contains the program memory for microcomputer 62 in the form of firmware, which is to be executed by microcomputer 62. The output frequency of aperature encoder 18 is directed to programmable frequency multiplier 70, which multiplies the frequency by a programmable multiplier, so that the resulting frequency at the output is on the order of 1 MHz, with a fixed phase relationship to the output frequency of the aperture encoder 18. The frequency multiplier 70 will be discussed in greater detail below.

A divide by 8 counter 72, that receives the output from crystal oscillator 66, may be any synchronous 4-bit binary counter such as a Texas Instruments SN74ALS161A. The output of counter 72 isone eighth the frequency of crystal oscillator 66. A digital multiplixer/selector 74, such as a Texas Instruments SN74ALS153, can select as its output either the output from programmable frequency multiplier 70 or the output from divide by 8 counter 72. Microcomputer 62 determines which of the inputs is to be selected by the digital multiplexer 74 and sent to a programmable frequency divider 76. The programmable frequency divider 76 may take the form of an Intel 8254. The divider 76 functions such that its TTL output is equal to the frequency of the input wave form (i.e., from the digital multiplex/selector 74) divided by a count modulus n (counter divide ratio), which is computer programmable via microcomputer 62.

As mentioned earlier, the source of the output waveform from the programmable frequency divider 76 may be either the aperture encoder waveform 18 (after passing through programmable frequency multiplier) or the crystal oscillator waveform 66 (after passing through divide by eight counter 72) depending on which is selected by microcomputer 62. The waveform from aperture encoder 18 is selected as the reference frequency input signal for document filming operations and, in these instances, the angular velocity of the DC motor 36 is controlled so that it is synchronized to the angular velocity of the drive roller shaft 24. Accordingly, the film's velocity is then synchronized, by some predetermined ratio, to the document's velocity. The waveform from crystal oscillator 66 is selected as the input to the programmable frequency divider 76 if it is desired to operate the film drive 38 independent of the motion of the document transport 10. Such independent operation might be used, for example in conjunction with high speed film advance, where the film drive is activated irrespective of whether or not the document drive is operational. It is possible, but not usually advantageous, for the crystal oscillator 66 to be selected as the reference input signal for normal microfilming operations. In this situation, the film drive 38 is operated asynchronously with respect to the document transport 10. The disadvantage of this type of operation is that the film image is now more sensitive to disturbances that occur in the document transport with no means being provided for automatically adjusting the film speed in response to those disturbances.

The output of the programmable frequency divider 76 acts as an input to phase-locked loop system 78, which comprises the following: digital phase frequency detector 80, loop filter 82, servo amplifier 84, DC motor 36 and optical encoder 48. Digital phase frequency detector 80 generates an error voltage at its output that is proportional to the frequency and/or phase difference between the TTL input waveforms from the programmable frequency divider 76 and the signal generated by the feedback encoder 48. The digital phase frequency detector 80 may be a Motorola MC4044. The loop filter 82 is an active filter consisting of resistors, capacitors, and operational amplifiers, such as the Texas Instruments μA 741, and is used to stabilize the phase-locked loop system 78 and to generate a DC output signal, which is directly proportional to the error voltage placed on its input. The servo amplifier 84 is a DC amplifier which amplifies the output signal from the loop filter 82 so that it can be used to drive DC motor 36. The optical encoder 48 is connected to the shaft of the DC motor 36 and generates a signal proportional to the speed of the DC motor 36. This signal is compared by the digital phase frequency detector 80 to the output of the programmable frequency divider 76. Thus, the phase-locked loop 78 tracks the frequency of the reference waveform derived from the output of the programmable frequency divider 76 and maintains a fixed phase relationship between the feedback waveform from the optical encoder 48 and the output from the programmable frequency divider 76. Consequently, the angular velocity of the DC motor 36 tracks the angular velocity of the document drive roller shaft 24 which results in the motion of the film being synchronized by some given ratio to the motion of the document. A dual single-pole-single-throw analog switch 86, such as that manufactured by Precision Monolithics Incorporated, Part No. SW-05 is used by the microcomputer to turn the DC motor 36 on and off, which in turn starts or stops the film drive 38.

Figure 4:
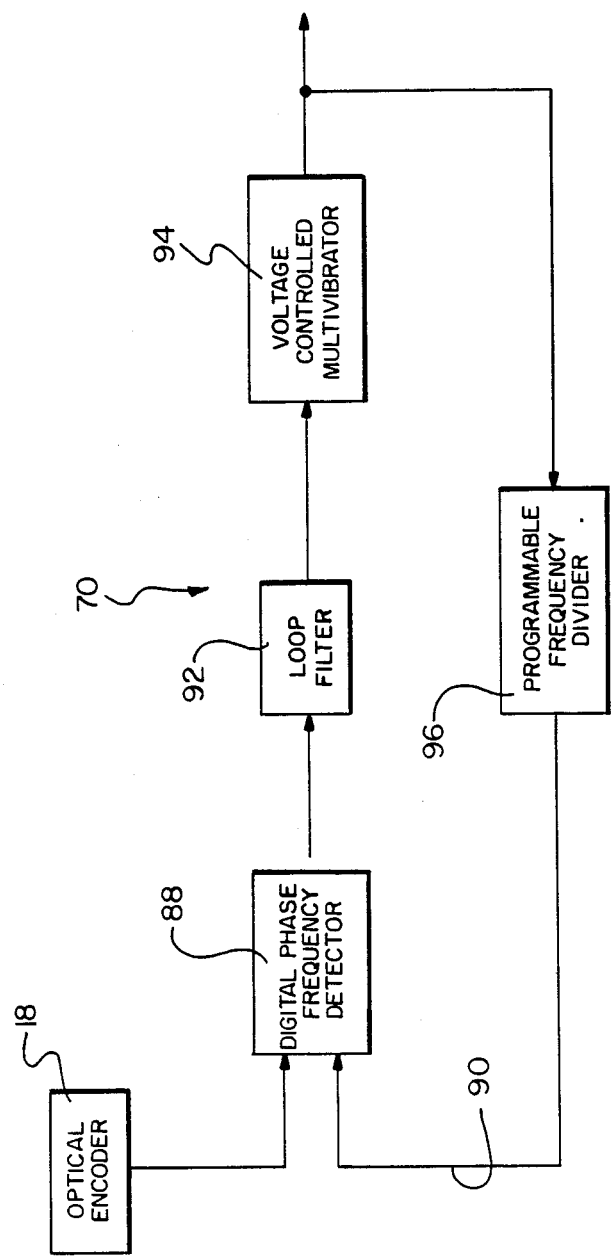
FIG. 4 is a schematic block diagram illustrating in more detail the contents of the programmable frequency multiplier illustrates in FIG. 3.

The programmable frequency multiplier 70 also uses phase-locked loop techniques internally and is actually a frequency synthesizer with a variable frequency input and a variable frequency output. FIG. 4 illustrates the functional elements of programmable frequency multiplier 70. A phase frequency detector 88 generates an error voltage that is proportional to the frequency and/or phase difference of the TTL signals occurring at its input, which are the output signal from the optical encoder 18 and the feedback signal on line 90. A loop filter 92 consisting of resistors, capacitors, and an operational amplifier such as a Texas Instrument μA 741 is used to stabilize the loop and generates at its output a DC voltage which is directly proportional to the error voltage signal appearing on the output of phase frequency detector 88. A voltage controlled multivibrator 94, such as the Motorola MC4024, accepts as its input the DC control voltage (in the range of 2.5V to 5.5V) from the output of the loop filter 92 and generates an output TTL signal, the frequency of which is in the range of 1.0 MHz to 5.0 MHz. A portion of this output signal is fed back through a programmable frequency divider 96 such as an Intel 8254 which is a 16-bit programmable counter. The output of the programmable frequency divider 96 follows the waveform of the optical encoder 18 in frequency, but exhibits a small but fixed phase relationship relative thereto. The TTL output waveform found on the output of the voltage controlled multivibrator 94 is phase-locked to the output signal of the optical encoder 18. The frequency of the output is directly proportional to the frequency of the output signal from the optical encoder 18. The constant of proportionality between the two signals is the count modulus (counter divide ratio) of the programmable frequency divider 96. The count modulus is computer programmable by the microcomputer 62.

The frequency of the output waveform from the programmable frequency multiplier 70 can be controlled within the limits of the voltage controlled multivibrator 94 (1.0 MHz to 5.0 MHz), despite changes in the frequency of the signal generated by optical encoder 18. As noted previously, the frequency of the signal generated by the optical encoder 18 changes when the angular velocity of the drive roller shaft 24 changes, which in turn is reflected in a change in the signal generated by optical encoder 18. It should be noted that it may be desirable to use a higher quality optical encoder, one that has higher resolution and eliminates the use of the programmable frequency multiplier 70. However, at the present time, optical encoders that provide an output signal on the order of megahertz would be very costly and in addition, would be too large to fit conveniently in the available space. Therefore, it appears that for the present time at least, the use of a programmable frequency multiplier provides a practical and ienxpensive method of achieving a high resolution equivalent optical encoder frequency, on the order of a megahertz, by using readily available, small size, low-resolution, inexpensive optical encoders.

In addition to the circuitry shown and discussed above, there are circuits that monitor operating conditions associated with the servo system and report such conditions to the host computer. In addition, the results of this diagnostic operation is made available to the microfilmer's service personnel and in a more limited form, the operator. The microcomputer 62 shuts down the film drive 38 by stopping the DC motor 36 whenever improper operation is detected in one or more of the major components.

By the addition of one encoder, information concerning film usage may be monitored by the computer. Film usage may be determined by feeding film drive encoder pulses into a counter. Use of an additional optical encoder on the film supply indicates when the film supply has completed a complete revolution. The computer is then given information as to the circumference of the film drive roller and the circumference of the film supply reel, which may be used to determine the number of film driven encoder pulses per revolution of the film supply reel. Thus, by knowing the film thickness and the diameter of the empty film reel core, the length of film remaining on the supply reel can be calculated. Alternatively, a look-up table could be generated experimentally, with an index to the look-up table representing the pulses from the film drive encoder per one revolution of the supply reel. Separate tables could be made for different thicknesses of film.

ADVANTAGES AND INDUSTRIAL APPLICABILITY

By using a servo film drive in an automatic microfilmer, it eliminates the bulky and expensive mechanical drives associated with multiple reduction ratio rotary microfilmers. Use of such drives in the past dictated the location of many of the components because of the space and layout required for the mechanical linkage associated with the document transport and film drives. Thus, the present invention allows greater freedom and flexibility concerning the relative placement of the document transport with respect to the film drive, The only constraint on their placement being the image path. Any mismatch between the film's velocity and the document's velocity relative thereto can be easily compensated for without changing any of the drive elements.

The invention is useful in automatic microfilm cameras having a document transport including drive means for advancing a document into an exposure station and exiting the document into a bit or hopper. The invention synchronizes the movement of a film upon advancement of the document to photograph successive image areas of the document at the exposure station onto the film at a focal plane.

What is claimed is:

1. In an automatic microfilm camera including a document transport system for transporting individual documents of varying size the improvement comprising:
    means for driving said transport system;
    means for monitoring the speed of said document transport system and generating a first signal proportional thereto;
    an intermittently operable film drive;
    means for driving said film drive only when documents are present in said transport system;
    means for generating a second signal in response to said first signal; and
    means for controlling the speed of said film drive in response to said second signal so as to electronically synchronize with respect to a predetermined ratio the speed of said film drive when driven to the speed of said document transport.

2. An automatic microfilm camera according to claim 1 wherein said means for monitoring the speed of said document transport system comprises an optical incremental encoder.

3. An automatic microfilm camera according to claim 2 wherein said means for driving said document transport comprises an AC motor.

4. An automatic microfilm camera according to claim 3 wherein said means for driving said film comprises a DC motor.

5. An automatic microfilm camera according to claim 4 wherein the means for controlling the speed of said DC motor comprises a servo amplifier.

6. An automatic microfilm camera according to claim 5 wherein the means for generating said second signal comprises a programmable frequency multiplier.

7. An automatic microfilm camera according to claim 6 wherein said servo amplifier controlled DC motor is gear driven to drive a metering roller, film take-up reel and film supply reel.

8. An automatic microfilm camera according to claim 3 wherein said microfilm camera further includes a computer programmable frequency for increasing the frequency of the signal indicative of the speed of said AC motor.

9. An automatic microfilm camera according to claim 6 wherein said programmable frequency multiplier includes phase-locked loop control means and ensures that the frequency of the output signal from said computer programmable frequency multiplier is a multiple of the signal frequency from said optical encoder.

10. An automatic microfilm camera according to claim 5 wherein said means for controlling the speed of said DC motor further includes an optical feedback encoder on said motor and a phase-locked loop control means connected to said servo amplifier and said feedback encoder.

* * * * *